(12) United States Patent
Patterson et al.

(10) Patent No.: US 11,359,159 B2
(45) Date of Patent: *Jun. 14, 2022

(54) LUBRICATING COMPOSITION CONTAINING A SELF-ASSEMBLING POLYMETHACRYLATE BLOCK COPOLYMER AND AN ETHYLENE-α-OLEFIN COPOLYMER

(71) Applicant: The Lubrizol Corporation, Wickliffe, OH (US)

(72) Inventors: Reid A. Patterson, Euclid, OH (US); Timothy R. Smith, Belper (GB); Paul S. O'Hora, Loughborough (GB); Edward P. Sampler, Loughborough (GB); Eugene Pashkovski, Moreland Hills, OH (US); Kieran Trickett, Belper (GB)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/626,033

(22) PCT Filed: Jun. 25, 2018

(86) PCT No.: PCT/US2018/039316
§ 371 (c)(1),
(2) Date: Dec. 23, 2019

(87) PCT Pub. No.: WO2019/005680
PCT Pub. Date: Jan. 3, 2019

(65) Prior Publication Data
US 2020/0115649 A1    Apr. 16, 2020

Related U.S. Application Data

(60) Provisional application No. 62/525,352, filed on Jun. 27, 2017.

(51) Int. Cl.

| | | |
|---|---|---|
| C10M 157/04 | (2006.01) | |
| C10M 145/14 | (2006.01) | |
| C10M 149/02 | (2006.01) | |
| C10M 169/04 | (2006.01) | |
| C10N 20/00 | (2006.01) | |
| C10N 30/04 | (2006.01) | |
| C10N 30/06 | (2006.01) | |
| C10N 30/10 | (2006.01) | |
| C10N 30/18 | (2006.01) | |
| C10N 40/04 | (2006.01) | |
| C10N 40/08 | (2006.01) | |
| C10N 40/10 | (2006.01) | |
| C10N 40/25 | (2006.01) | |

(52) U.S. Cl.
CPC ........ *C10M 157/04* (2013.01); *C10M 145/14* (2013.01); *C10M 149/02* (2013.01); *C10M 169/041* (2013.01); *C10M 2203/003* (2013.01); *C10M 2209/084* (2013.01); *C10M 2217/06* (2013.01); *C10N 2020/073* (2020.05); *C10N 2030/04* (2013.01); *C10N 2030/06* (2013.01); *C10N 2030/10* (2013.01); *C10N 2030/18* (2013.01); *C10N 2040/04* (2013.01); *C10N 2040/08* (2013.01); *C10N 2040/10* (2013.01); *C10N 2040/25* (2013.01)

(58) Field of Classification Search
CPC .............. C10M 157/04; C10M 149/02; C10M 145/14; C10M 169/041; C10M 2203/003; C10M 2217/06; C10M 2209/084; C10N 2020/02; C10N 2030/041; C10N 2030/02
See application file for complete search history.

(56) References Cited

U.S. PATENT DOCUMENTS

| | | |
|---|---|---|
| 4,537,697 A | 8/1985 | Girard |
| 5,955,405 A | 9/1999 | Liesen et al. |
| 7,691,797 B2 | 4/2010 | Schmidt et al. |
| 2006/0025316 A1 | 2/2006 | Covitch et al. |
| 2007/0244018 A1* | 10/2007 | Visger ................. C08F 293/005 508/545 |
| 2012/0135899 A1 | 5/2012 | Kocsis et al. |
| 2013/0143780 A1 | 6/2013 | Gieselman et al. |

FOREIGN PATENT DOCUMENTS

| | | |
|---|---|---|
| CN | 102459542 A | 5/2012 |
| CN | 103119140 A | 5/2013 |
| EP | 0338672 A1 | 10/1989 |
| EP | 1795581 A1 | 6/2007 |
| WO | 2005056739 A1 | 6/2005 |
| WO | 2006047393 A1 | 5/2006 |
| WO | 2006047398 A2 | 5/2006 |

OTHER PUBLICATIONS

Sogah, Dotsevi Y., et al., Group Transfer Polymerization. Polymerization of Acrylic Monomers, Macromolecules, 1987, pp. 1473-1488, vol. 20, No. 7, American Chemical Society, Wilmington, Delaware.

(Continued)

*Primary Examiner* — Vishal V Vasisth
(74) *Attorney, Agent, or Firm* — Eryn Ace Fuhrer; Teresan W. Gilbert

(57) ABSTRACT

The invention provides a lubricating composition comprising an oil of lubricating viscosity and synergistic mixture of a functionalized ethylene-α-olefin copolymer, a poly(meth)acrylate block polymer having a substantially oil soluble block and a substantially oil insoluble block. The invention also provides a method of lubricating a mechanical device using such a lubricating composition.

22 Claims, No Drawings

(56) References Cited

OTHER PUBLICATIONS

Nakagawa, Osamu, et al., Preparation of Highly Syndiotactic Block Copolymers of Methyl Methacrylate and Lauryl Methacrylate and their Characterization, Polymer Bulletin, Sep. 7, 1992, pp. 579-586, Springer-Verlag, Osaka, Japan.
Patrickios, C.S., et al., Diblock, ABC Triblock, and Random Methacrylic Polyampholytes: Synthesis by Group Transfer Polymerization and Solution Behavior, Macromolecules, 1994, pp. 930-937, American Chemical Society, Cambridge, Massachusetts.
Sannigrahi, Biswajit, et al., Copolymerization of Methyl Methacrylate with Lauryl Methacrylate Using Group Transfer Polymerization, J Polym Sci A: Polym Chem, Dec. 17, 1996, vol. 35, pp. 1999-2007, John Wiley & Sons, Inc., Pune, India.
Pitsikalis, Marinos, et al., Block Copolymers of Styrene and Stearyl Methacrylate. Synthesis and Micellization Properties in Selective Solvents, Macromolecules, Jul. 6, 2000, vol. 33, pp. 5460-5469, American Chemical Society, Web.

* cited by examiner

LUBRICATING COMPOSITION CONTAINING A SELF-ASSEMBLING POLYMETHACRYLATE BLOCK COPOLYMER AND AN ETHYLENE-α-OLEFIN COPOLYMER

CROSS REFERENCE TO RELATED APPLICATION

This application claims priority from PCT Application Serial No. PCT/US2018/039316 filed on Jun. 25, 2018, which claims the benefit of U.S. Provisional Application No. 62/525,352 filed on Jun. 27, 2017; the entirety of both is hereby incorporated by reference.

BACKGROUND OF THE INVENTION

Lubricating oils, such as engine oils, gear oils, transmission fluids, and hydraulic fluids typically contain additives to improve various aspects of their performance. Such additives may include dispersants, antioxidants, detergents, friction modifiers, defoamers, pour point depressants, and viscosity modifiers to control fluid rheology An important aspect of fluid rheology is the occurrence of normal stresses, sometimes referred to as the "normal force" in non-Newtonian polymer containing fluids. For elastic non-Newtonian fluids, stresses under shearing conditions create higher normal stresses along and perpendicular to the direction of flow. The difference between these normal stresses may be considered as tension in the streamlines, and is due to the transition of polymer chains into a non-equilibrium (asymmetrical) conformation. Under equilibrium conditions, polymer chains exist as entangled coils. As these polymers are strained, the chains elongate and any existing entanglements may come apart. Even polymer chains under dilute conditions that are not entangled will deform due to flow. Because Brownian motion tries to return the polymer chains to their equilibrium, average symmetrical state, a stress is generated in the perpendicular, or normal, direction of the shear flow. In a hydrodynamic lubricating regime, generation of a lifting force is associated with viscous energy losses, however the additional elastic lifting force, or normal force, helps to reduce these viscous losses. Therefore, viscoelastic lubricating fluids that impart a high normal force are able to improve mechanical durability.

One approach to improving engine efficiency is to decrease the viscosity of the lubricant used. However, reducing viscosity may affect the durability of the engine components due to lower hydrodynamic lifting force of the less viscous lubricant. Therefore, there is a need to formulate lubricating compositions that provide additional elastic lifting force (i.e. normal force) without additional thickening of the oil.

Additionally or alternatively, energy efficiency can be increased by reducing the energy needed to move a fluid through a complex hydraulic system. Existing high molecular weight flow improvers, often based on polyisobutylene, are typically unsuitable for use in hydraulic systems because of the high shear conditions to which they are subjected. Therefore, a need also exists for a shear stable flow improver useful in hydraulic fluids.

SUMMARY OF THE INVENTION

As used herein reference to the amounts of additives present in the lubricating composition disclosed herein are quoted on an oil free basis, i.e., amount of actives, unless otherwise indicated.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration.

The present invention provides a lubricating composition comprising an oil of lubricating viscosity, an ethylene-α-olefin copolymer, wherein the ethylene-α-olefin copolymer is grafted with a polar moiety, and a poly(meth)acrylate polymer wherein the poly(meth)acrylate polymer comprises a block or tapered block copolymer (P) comprising a first block ($B_1$) which is substantially insoluble in the base oil and a second block ($B_2$) which is substantially soluble in the base oil. The first block ($B_1$) may be formed from a variety of monomers that will form a block that is substantially insoluble in oil including $C_1$ to $C_4$ alkyl(meth)acrylate monomers and aromatic (meth)acrylate monomers, such as benzyl methacrylate. The second block ($B_2$) may be formed from monomers that will form a block that is substantially soluble in oil, such as $C_8$ to $C_{32}$ alkyl(meth)acrylate monomers. The combination of the poly(meth)acrylate block copolymer described herein and the ethylene-α-olefin copolymer grafted with a polar moiety have a synergistic effect in improving the normal force of the lubricating composition thereby enhancing the durability of lubricating compositions.

DETAILED DESCRIPTION OF THE INVENTION

The present invention provides a lubricating composition and a method for lubricating a mechanical device as disclosed herein.

Oils of Lubricating Viscosity

The lubricating composition comprises an oil of lubricating viscosity. Such oils include natural and synthetic oils, oil derived from hydrocracking, hydrogenation, and hydrofinishing, unrefined, refined, re-refined oils or mixtures thereof. A more detailed description of unrefined, refined and re-refined oils is provided in International Publication WO2008/147704, paragraphs [0054] to [0056] (a similar disclosure is provided in US Patent Application 2010/197536, see [0072] to [0073]). A more detailed description of natural and synthetic lubricating oils is described in paragraphs [0058] to [0059] respectively of WO0008/147704 (a similar disclosure is provided in US Patent Application 2010/197536, see [0075] to [0076]). Synthetic oils may also be produced by Fischer-Tropsch reactions and typically may be hydroisomerised Fischer-Tropsch hydrocarbons or waxes. In one embodiment oils may be prepared by a Fischer-Tropsch gas-to-liquid synthetic procedure as well as other gas-to-liquid oils.

Oils of lubricating viscosity may also be defined as specified in April 2008 version of "Appendix E-API Base Oil Interchangeability Guidelines for Passenger Car Motor Oils and Diesel Engine Oils", section 1.3 Sub-heading 1.3.

"Base Stock Categories". The API Guidelines are also summarised in U.S. Pat. No. 7,285,516 (see column 11, line 64 to column 12, line 10).

In one embodiment the oil of lubricating viscosity may be an API Group I to IV mineral oil, an ester or a synthetic oil, or mixtures thereof. In one embodiment the oil of lubricating viscosity may be an API Group II, Group III, Group IV mineral oil, an ester or a synthetic oil, or mixtures thereof.

The amount of the oil of lubricating viscosity present is typically the balance remaining after subtracting from 100 wt % the sum of the amount of the additives of the invention and the other performance additives.

The lubricating composition may be in the form of a concentrate and/or a fully formulated lubricant. If the lubricating composition of the invention (comprising the additives disclosed herein) is in the form of a concentrate which may be combined with additional oil to form, in whole or in part, a finished lubricant), the ratio of the of these additives to the oil of lubricating viscosity and/or to diluent oil include the ranges of 1:99 to 99:1 by weight, or 80:20 to 10:90 by weight. Typically the lubricating composition of the invention comprises at least 50 wt %, or at least 60 wt %, or at least 70 wt %, or at least 80 wt % of an oil of lubricating viscosity.

Functionalized Ethylene-α-Olefin Copolymer

The lubricating composition of the invention contains a functionalized olefin copolymer. In one useful embodiment, the functionalized olefin copolymer is a functionalized ethylene-α-olefin copolymer. As used herein, the term "functionalized" means that the olefin polymer has been modified by the addition of a polar moiety. The olefin polymer and process for addition of the polar moieties is described in more detail below.

The olefin polymer may be derived from isobutylene or isoprene. In one useful embodiment, the olefin polymer is prepared from ethylene and a higher olefin within the range of C3-C10 alpha-mono-olefins, for example, the olefin polymer may be prepared from ethylene and propylene.

In one embodiment, the olefin polymer may be a polymer of 15 to 80 mole percent of ethylene, for example, 30 mol percent to 70 mol percent ethylene and from and from 20 to 85 mole percent of C3 to C10 mono-olefins, such as propylene, for example, 30 to 70 mol percent propylene or higher mono-olefins. Terpolymer variations of the olefin copolymer may also be used and may contain up to 15 mol percent of a non-conjugated diene or triene. Non-conjugated dienes or trienes may have 5 to about 14 carbon atoms. The non-conjugated diene or triene monomers may be characterized by the presence of a vinyl group in the structure and can include cyclic and bicyclic compounds. Representative dienes include 1,4-hexadiene, 1,4-cyclohexadiene, dicyclopentadiene, 5-ethyldiene-2-norbornene, 5-methylene-2-norbornene, 1,5-heptadiene, and 1,6-octadiene.

In one embodiment, the olefin copolymer may be a copolymer of ethylene, propylene, and butylene. The polymer may be prepared by polymerizing a mixture of monomers comprising ethylene, propylene and butylene. Such polymers may be referred to as copolymers or terpolymers. In one embodiment of the invention, a useful terpolymer may comprise from about 5 mol % to about 20 mol %, or from about 5 mol % to about 10 mol % structural units derived from ethylene; from about 60 mol % to about 90 mol %, or from about 60 mol % to about 75 mol structural units derived from propylene; and from about 5 mol % to about 30 mol %, or from about 15 mol % to about 30 mol % structural units derived from butylene. The butylene may comprise any isomers or mixtures thereof, such as n-butylene, iso-butylene, or a mixture thereof. The butylene may comprise butene-1. Commercial sources of butylene may comprise butene-1 as well as butene-2 and butadiene. In one embodiment, the butylene may comprise a mixture of butene-1 and isobutylene wherein the weight ratio of butene-1 to isobutylene is about 1:0.1 or less. In another embodiment, the butylene may comprise butene-1 and be free of or essentially free of isobutylene.

In another exemplary embodiment, the olefin copolymer may be a copolymer of ethylene and butylene, which may be prepared by polymerizing a mixture of monomers comprising ethylene and butylene wherein the monomer composition is free of or substantially free of propylene monomers (i.e. contains less than 1 weight percent of intentionally added monomer). In this embodiment, the copolymer may comprise 30 to 50 mol percent structural units derived from butylene; and from about 50 mol percent to 70 mol percent structural units derived from ethylene. The butylene may comprise a mixture of butene-1 and isobutylene wherein the weight ratio of butene-1 to isobutylene is about 1:0.1 or less. The butylene may comprise butene-1 and be free of or essentially free of isobutylene.

The olefin polymers useful in the present invention, in particular, the ethylene-α-olefin copolymers have a number average molecular weight, determined by Gel Permeation Chromatography (GPC) using a polystyrene standard, ranging from 1000 to 500,000 Daltons, for example, 3000 to 300,000 Daltons, or even 3000 to 200,000 Daltons, or even 3000 to 120,000 Daltons, or 10,000 to 60,000 Daltons, or 20,000 to 50,000 Daltons.

The olefin polymers are functionalized by modifying the polymer by the addition of a polar moiety. In one useful embodiment, the functionalized copolymer is the reaction product of an olefin polymer grafted with an acylating agent. In one embodiment, the acylating agent may be an ethylenically unsaturated acylating agent. Useful acylating agents are typically α,β unsaturated compounds having at least one ethylenic bond (prior to reaction) and at least one, for example two, carboxylic acid (or its anhydride) groups or a polar group which is convertible into said carboxyl groups by oxidation or hydrolysis. The acylating agent grafts onto the olefin polymer to give two carboxylic acid functionalities. Examples of useful acylating agents include maleic anhydride, chlormaleic anhydride, itaconic anhydride, or the reactive equivalents thereof, for example, the corresponding dicarboxylic acids, such as maleic acid, fumaric acid, cinnamic acid, (meth)acrylic acid, the esters of these compounds and the acid chlorides of these compounds.

In one embodiment, the functionalized ethylene-α-olefin copolymer comprises an olefin copolymer grafted with the acyl group which is further functionalized with a hydrocarbyl amine, a hydrocarbyl alcohol group, amino- or hydroxy-terminated polyether compounds, and mixtures thereof.

Amine functional groups may be added to the olefin polymer by reacting the olefin copolymer (typically, an ethylene-α-olefin copolymer, such as an ethylene-propylene copolymer) with an acylating agent (typically maleic anhydride) and a hydrocarbyl amine having a primary or secondary amino group. In one embodiment, the hydrocarbyl amine may be selected from aromatic or heteroaromatic amines, aliphatic amines, and mixtures thereof.

In one embodiment, the hydrocarbyl amine component may comprise at least one aromatic amine containing at least one amino group capable of condensing with said acyl group to provide a pendant group and at least one additional group comprising at least one nitrogen, oxygen, or sulfur atom, wherein said aromatic amine is selected from the group consisting of (i) a nitro-substituted aniline, (ii) an amine comprising two aromatic moieties linked by a —C(O)NR— group, a —C(O)O— group, an —O— group, an —N═N— group, or an —SO$_2$— group where R is hydrogen or hydrocarbyl, one of said aromatic moieties bearing said condensable amino group, (iii) an aminoquinoline, (iv) an aminobenzimidazole, (v) an N,N-dialkylphenylenediamine, (vi), an aminodiphenylamine (also N,N-phenyl diamine), and (vii) a ring-substituted benzyl amine.

Aromatic amines useful for providing the polar moiety of the functionalized ethylene-α-olefin copolymer may also include those which can be represented by the general structure NH$_2$—Ar or T-NH—Ar, where T may be alkyl or aromatic, Ar is an aromatic group, including nitrogen-containing or amino-substituted aromatic groups and Ar groups including any of the following structures:

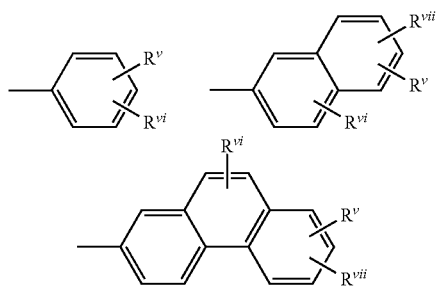

as well as multiple non-condensed or linked aromatic rings. In these and related structures, $R^v$, $R^{vi}$, and $R^{vii}$ can be independently, among other groups disclosed herein, —H, —C$_{1-18}$ alkyl groups, nitro groups, —NH—Ar, —N═N—Ar, —NH—CO—Ar, —OOC—Ar, —OOC—C$_{1-18}$ alkyl, —COO—C$_{1-18}$ alkyl, —OH, —O—(CH$_2$CH$_2$—O)$_n$C$_{1-18}$ alkyl groups, and —O—(CH$_2$CH$_2$O)$_n$Ar (where n is 0 to 10).

Useful aromatic amines may also include those amines wherein a carbon atom of the aromatic ring structure is attached directly to the amino nitrogen. The amines may be monoamines or polyamines. The aromatic ring will typically be a mononuclear aromatic ring (i.e., one derived from benzene) but can include fused aromatic rings, especially those derived from naphthalene. Examples of aromatic amines include aniline, N-alkylanilines such as N-methylaniline and N-butylaniline, di-(para-methylphenyl)amine, 4-aminodiphenyl amine, N,N-dimethylphenylenediamine, naphthylamine, 4-(4-nitrophenylazo)aniline (disperse orange 3), sulphamethazine, 4-phenoxyaniline, 3-nitroaniline, 4-aminoacetanilide (N-(4-aminophenyl)acetamide)), 4-amino-2-hydroxy-benzoic acid phenyl ester (phenyl amino salicylate), N-(4-amino-phenyl)-benzamide, various benzylamines such as 2,5-dimethoxybenzylamine, 4-phenylazoaniline, and substituted versions of these. Other examples include para-ethoxyaniline, para-dodecylaniline, cyclohexyl-substituted naphthylamine, and thienyl-substituted aniline. Examples of other suitable aromatic amines include amino-substituted aromatic compounds and amines in which the amine nitrogen is a part of an aromatic ring, such as 3-aminoquinoline, 5-aminoquinoline, and 8-aminoquinoline. Also included are aromatic amines such as 2-aminobenzimidazole, which contains one secondary amino group attached directly to the aromatic ring and a primary amino group attached to the imidazole ring. Other amines include N-(4-anilinophenyl)-3-aminobutanamide or 3-amino propyl imidazole. Yet other amines include 2,5-dimethoxybenzylamine.

Additional aromatic amines and related compounds that may be useful for the functional group are disclosed in U.S. Pat. Nos. 6,107,257 and 6,107,258; some of these include aminocarbazoles, benzoimidazoles, aminoindoles, aminopyrroles, amino-indazolinones, aminoperimidines, mercaptotriazoles, aminophenothiazines, aminopyridines, aminopyrazines, aminopyrimidines, pyridines, pyrazines, pyrimidines, aminothiadiazoles, aminothiothiadiazoles, and aminobenzotriaozles. Other suitable amines include 3-amino-N-(4-anilinophenyl)-N-isopropyl butanamide, and N-(4-anilinophenyl)-3-{(3-aminopropyl)-(cocoalkyl) amino} butanamide. Other aromatic amines which can be used include various aromatic amine dye intermediates containing multiple aromatic rings linked by, for example, amide structures. Examples include materials of the general structure:

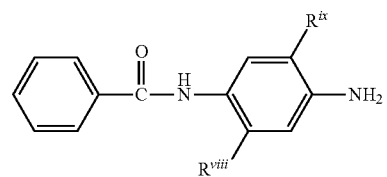

and isomeric variations thereof, where $R^{viii}$ and $R^{ix}$ are independently alkyl or alkoxy groups such as methyl, methoxy, or ethoxy. In one instance, $R^{viii}$ and $R^{ix}$ are both —OCH$_3$ and the material is known as Fast Blue RR [CAS #6268-05-9].

In another instance, $R^{ix}$ is —OCH$_3$ and $R^{viii}$ is —CH$_3$, and the material is known as Fast Violet B [CAS #99-21-8]. When both $R^{viii}$ and $R^{ix}$ are ethoxy, the material is Fast Blue BB [CAS #120-00-3]. U.S. Pat. No. 5,744,429 discloses other aromatic amine compounds, particularly aminoalkylphenothiazines. N-aromatic substituted acid amide compounds, such as those disclosed in U.S. Patent Application 2003/0030033 A1, may also be used for the purposes of this invention. Suitable aromatic amines include those in which the amine nitrogen is a substituent on an aromatic carboxylic compound, that is, the nitrogen is not sp$^2$ hybridized within an aromatic ring.

In another embodiment, a useful aromatic amine may also comprise an amine formed by reacting an aldehyde with 4-aminodiphenylamine. The resultant amine may be described as an alkylene coupled amine having at least 4 aromatic groups, at least one —NH$_2$ functional group, and at least 2 secondary or tertiary amino groups. The aldehyde may be aliphatic, alicyclic or aromatic. The aliphatic aldehyde may be linear or branched. Examples of a suitable aromatic aldehyde include benzaldehyde or o-vanillin. Examples of an aliphatic aldehyde include formaldehyde (or a reactive equivalent thereof such as formalin or paraformaldehyde), ethanal or propanal. Typically the aldehyde may be formaldehyde or benzaldehyde. Alternatively, this aromatic amine may also be prepared by the methodology described in Berichte der Deutschen Chemischen Gesellschaft (1910), 43, 728-39.

The aromatic amine formed by coupling an aldehyde and 4-aminodiphenylamine is described European Patent application EP 2 401 348 A in and may also be represented by the formula:

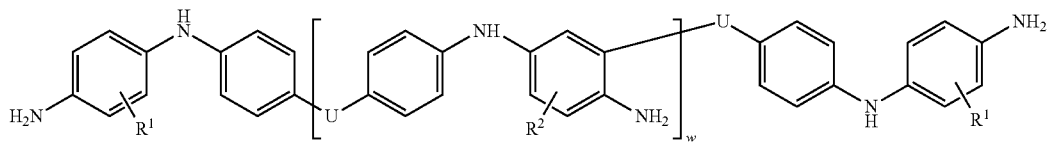

wherein each variable

R¹ may be hydrogen or a $C_{1-5}$ alkyl group (typically hydrogen);

R² may be hydrogen or a $C_{1-5}$ alkyl group (typically hydrogen);

U may be an aliphatic, alicyclic or aromatic group, with the proviso that when U is aliphatic, the aliphatic group may be linear or branched alkylene group containing 1 to 5, or 1 to 2 carbon atoms; and w may be 0 to 9 or 0 to 3 or 0 to 1 (typically 0).

In one embodiment, the aromatic amine includes 4-aminodiphenylamine, aldehyde (typically formaldehyde) coupled 4-aminodiphenylamine, nitro-aniline (3-nitro-aniline), disperse orange-3 (DO3), or mixtures thereof.

In one embodiment, the hydrocarbyl amine component may comprise at least one aliphatic amine containing at least one amino group capable of condensing with said acyl group to provide a pendant group and at least one additional group comprising at least one nitrogen, oxygen, or sulfur atom. Suitable aliphatic amines include polyethylene polyamines (such as tetraethylene pentamine (TEPA), triethylene tetra amine (TETA), pentaethylene hexamine (PEHA), and polyamine bottoms), N,N-dimethylaminopropylamine (DMAPA), N-(aminopropyl)morpholine, N,N-diIsostearylaminopropylamine, ethanolamine, and combinations thereof.

In another one embodiment, the polar moiety added to the functionalized ethylene-α-olefin copolymer may be derived from a hydrocarbyl alcohol group, containing at least one hydroxy group capable of condensing with said acyl group to provide a pendant group and at least one additional group comprising at least one nitrogen, oxygen, or sulfur atom. The alcohol functional groups may be added to the olefin polymer by reacting the olefin copolymer with an acylating agent (typically maleic anhydride) and a hydrocarbyl alcohol. Suitable hydrocarbyl alcohols include trimethylol propane (TMP), pentaerythritol, dimethylaminopropanol, 4-(2-hydroxyethyl)morpholine and isomers, 4-(3-hydroxypropyl) morpholine and isomers, In another one embodiment, the polar moiety added to the functionalized ethylene-α-olefin copolymer may be amine-terminated polyether compounds, hydroxy-terminated polyether compounds, and mixtures thereof. The hydroxy terminated or amine terminated polyether may be selected from the group comprising polyethylene glycols, polypropylene glycols, mixtures of one or more amine terminated polyether compounds containing units derived from ethylene oxides, propylene oxides, butylene oxides or some combination thereof, or some combination thereof. Suitable polyether compounds include the Synalox® line of polyalkylene glycol compounds, the UCON™ OSP line of polyether compounds available from Dow Chemical, and the Jeffamine® line of polyether amines available from Huntsman.

In one embodiment, the ethylene-α-olefin copolymer is grafted with a polar moiety, comprising an acyl group, wherein the acyl group is provided by an acylating agent, such as maleic anhydride. In the present invention, the ethylene-α-olefin copolymer is reacted with 1% to 3.5% by weight, for example, 1.5% to 3.25% by weight of an acylating agent based on the total weight of the ethylene-α-olefin copolymer plus acylating agent. The so acylated ethylene-α-olefin copolymer may be further reacted with a hydrocarbyl amine. The amount of the hydrocarbyl amine may be an equivalent mole percent to the mole percent of the acyl groups or an amount to fulfill the stoichiometric needs to fully react with all of the acyl groups. In one embodiment, the functionalized ethylene-α-olefin copolymers have a weight average molecular weight, measured by gel permeation chromatography calibrated to polystyrene standards, of 50,000 Daltons up to 200,000 Daltons, for example, 100,000 Daltons to 175,000 Daltons.

The formation of functionalized ethylene-α-olefin copolymer is well known in the art, for instance those described in U.S. Pat. No. 7,790,661 column 2, line 48 to column 10, line 38. Additional detailed descriptions of similar functionalized ethylene-α-olefin copolymers are found in International Publication WO2006/015130 or U.S. Pat. Nos. 4,863,623; 6,107,257; 6,107,258; 6,117,825; and 7,790,661. In one embodiment the functionalized ethylene-α-olefin copolymer may include those described in U.S. Pat. No. 4,863,623 (see column 2, line 15 to column 3, line 52) or in International Publication WO2006/015130 (see page 2, paragraph [0008] and preparative examples are described paragraphs [0065] to [0073]).

The lubricating compositions of the present invention comprise 0.01 wt % to 2 wt %, or 0.01 wt % to 1.5 wt %, or 0.1 to 1 wt %, or 0.1 wt % to 0.5 wt %, or 0.1 wt % to 0.3 wt % of the functionalized ethylene-α-olefin copolymer as described herein.

Polymethacrylate Polymers

The lubricating composition of the present invention also comprises a poly(meth)acrylate polymer. As used herein, the term "(meth)acrylate" means either methacrylate or acrylate, as will be readily understood.

In one embodiment, the poly(meth)acrylate polymer is prepared from a monomer mixture comprising (meth)acrylate monomers having alkyl groups of varying length. The (meth)acrylate monomers may contain alkyl groups that are straight chain or branched chain groups or aromatic groups. The alkyl groups may contain 1 to 24 carbon atoms, for example 1 to 20 carbon atoms.

The poly(meth)acrylate polymers described herein are formed from monomers derived from saturated alcohols, such as methyl (meth)acrylate, ethyl (meth)acrylate, propyl (meth)acrylate, butyl (meth)acrylate, 2-methylpentyl (meth)acrylate, 2-propylheptyl (meth)acrylate, 2-butyloctyl (meth)acrylate, 2-ethylhexyl (meth)acrylate, octyl (meth)acrylate, nonyl (meth)acrylate, isooctyl (meth)acrylate, isononyl (meth)acrylate, 2-tert-butylheptyl (meth)acrylate, 3-isopropylheptyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylhepta-decyl (meth)acrylate, 4-tert-butyloctadecyl (meth)acrylate, 5-ethyloctadecyl (meth)acrylate, 3-isopropyloctadecyl-(meth)acrylate, octadecyl (meth)acrylate, nonadecyl (meth)acrylate, eicosyl (meth)acrylate, (meth)acrylates derived from unsaturated alcohols, such as oleyl (meth)acrylate; and cycloalkyl (meth)acrylates, such as 3-vinyl-2-butylcyclohexyl (meth) acrylate or bornyl (meth)acrylate.

Other examples of monomers include alkyl (meth)acrylates with long-chain alcohol-derived groups which may be obtained, for example, by reaction of a (meth)acrylic acid (by direct esterification) or methyl (meth)acrylate (by transesterification) with long-chain fatty alcohols, in which reaction a mixture of esters such as (meth)acrylate with alcohol groups of various chain lengths is generally obtained. These fatty alcohols include Oxo Alcohol® 7911, Oxo Alcohol® 7900 and Oxo Alcohol® 1100 of Monsanto; Alphanol® 79 of ICI; Nafol® 1620, Alfol® 610 and Alfol® 810 of Condea (now Sasol); Epal® 610 and Epal® 810 of Ethyl Corporation; Linevol® 79, Linevol® 911 and Dobanol® 25 L of Shell AG; Lial® 125 of Condea Augusta, Milan; Dehydad® and Lorol® of BASF, as well as Linopol® 7-11 and Acropol® 91 of Ugine Kuhlmann. Further examples of monomers include alkyl (methacrylates) with branched chain alcohol-derived groups which may be obtained, for example, by reaction of a (meth)acrylic acid (by direct esterification) or methyl (meth)acrylate (by transesterification) with Guerbet alcohols. Examples of Guerbet alcohols include 2-butyloctanol, 2-butyldecanol, 2-hexyloctanol, 2-hexyldecanol, 2-octyldecanol, 2-hexyldodecanol, 2-octyldodecanol, 2-decyltetradecanol, 2-dodecylhexadecanol, and 2-tetradecyloctadecanol.

Aromatic monomers may include, for example, benzyl methacrylate. In another embodiment, the aromatic monomers may be selected from phenyl methacrylate, phenylpropyl methacrylate or styrene. It is contemplated that other oil insoluble (meth)acrylate monomers that are polymerizable in oil may also be used. Mixtures of these and other oil insoluble monomers may also be used in the present invention.

In one embodiment, the poly(meth)acrylate polymer comprises a dispersant monomer; dispersant monomers include those monomers which may copolymerize with (meth)acrylate monomers and contain one or more heteroatoms in addition to the carbonyl group of the (meth)acrylate. The dispersant monomer may contain a nitrogen-containing group, an oxygen-containing group, or mixtures thereof.

The oxygen-containing compound may include hydroxyalkyl(meth)acrylates such as 3-hydroxypropyl (meth)acrylate, 3,4-dihydroxybutyl (meth)acrylate, 2-hydroxyethyl (meth)acrylate, 2-hydroxypropyl (meth)acrylate, 2,5-dimethyl-1,6-hexanediol (meth)acrylate, 1,10-decanediol (meth)acrylate, carbonyl-containing (meth)acrylates such as 2-carboxyethyl (meth)acrylate, carboxymethyl (meth)acrylate, oxazolidinylethyl (meth)acrylate, N-(methacryloyloxy) formamide, acetonyl (meth)acrylate, N-methacryloylmorpholine, N-methacryloyl-2-pyrrolidinone, N-(2-methacryloyl-oxyethyl)-2-pyrrolidinone, N-(3-methacryloyloxypropyl)-2-pyrrolidinone, N-(2-methacryloyloxypentadecyl)-2-pyrrolidinone, N-(3-methacryloyloxy-heptadecyl)-2-pyrrolidinone; glycol di(meth)acrylates such as 1,4-butanediol (meth)acrylate, 2-butoxyethyl(meth)acrylate, 2-ethoxyethoxymethyl(meth) acrylate, 2-ethoxyethyl(meth)acrylate, or mixtures thereof.

The nitrogen-containing compound may be a (meth) acrylamide or a nitrogen containing (meth)acrylate monomer. Examples of a suitable nitrogen-containing compound include N,N-dimethylacrylamide, N-vinyl carbonamides such as N-vinyl-formamide, vinyl pyridine, N-vinylacetoamide, N-vinyl propionamides, N-vinyl hydroxy-acetoamide, N-vinyl imidazole, N-vinyl pyrrolidinone, N-vinyl caprolactam, dimethylaminoethyl acrylate (DMAEA), dimethylaminoethyl methacrylate (DMAEMA), dim ethyl aminobutyl acrylamide, dim ethyl aminopropyl meth-acrylate (DMAPMA), dim ethyl aminopropyl acrylamide, di m ethyl-aminopropyl methacrylamide, dimethylaminoethyl acrylamide or mixtures thereof.

Dispersant monomers may be present in an amount up to 5 mol percent of the monomer composition of the (meth) acrylate polymer. In one embodiment, a dispersant monomer is present in the poly(meth)acrylate polymer in an amount 0 to 5 mol percent, 0.5 to 4 mol percent, or 0.8 to 3 mol percent of the polymer composition. In one embodiment, the poly (meth)acrylate is free of or substantially free of dispersant monomers.

In one embodiment, the poly(meth)acrylate is a block copolymer or tapered block copolymer. Block copolymers are formed from a monomer mixture comprising one or more (meth)acrylate monomers, wherein, for example, a first (meth)acrylate monomer forms a discrete block of the polymer joined to a second discrete block of the polymer formed from a second (meth)acrylate monomer. While block copolymers have substantially discrete blocks formed from the monomers in the monomer mixture, a tapered block copolymer may be composed of, at one end, a relatively pure first monomer and, at the other end, a relatively pure second monomer. The middle of the tapered block copolymer is more of a gradient composition of the two monomers.

In one embodiment of the invention, the poly(meth) acrylate polymer (P) is a block or tapered block copolymer that comprises at least one polymer block ($B_1$) that is insoluble or substantially insoluble in the base oil and a second polymer block ($B_2$) that is soluble or substantially soluble in the base oil. The Hildebrand solubility parameter can be used as a guide to determine the solubility of polymers in a specific medium. This parameter is described in detail in the *Polymer Handbook*, Fourth Edition, ed, J. Brandrup, E. J. Immergut, and E. A. Grulke, John Wiley & Sons, New York, 1999 in the chapter titled "Solubility Parameter Values." Compatibility of segments of a block or tapered block copolymer can be estimated using the Hildebrand solubility parameters. For example, the oil-soluble block typically will have a solubility parameter of 14-18 $(J/m^3)^{1/2}$ while an oil insoluble block will have a solubility parameter greater than 18 $(J/m^3)^{1/2}$ or even in some embodiments greater than 19 $(J/m^3)^{1/2}$. Generally, the solubility parameter is measured or calculated for homopolymers made from particular (meth)acrylate monomers, which allows the selection of monomers for preparing the poly (meth)acrylate polymer as described above.

The block copolymer useful in the present invention comprises two or more blocks. A copolymer with two blocks may be described as a di-block AB type copolymer. A block copolymer that has three blocks (i.e. a tri-block copolymer), may be described as an ABA type copolymer or an ABC type copolymer. In one embodiment, block copolymers with three of more blocks may comprise at least one polymer block that is insoluble or substantially insoluble in the base oil. In block copolymers with three or more blocks with at least one insoluble block, the insoluble block may be an external or terminal block, i.e. a polymer block containing one polymer end which may be functionalized with an initiator fragment or chain transfer moiety.

In one embodiment, the poly(meth)acrylate polymers may have an architecture selected from linear, branched, hyper-branched, cross-linked, star (also referred to as "radial"), or combinations thereof. Star or radial refers to multi-armed polymers. Such polymers include (meth)acrylate-containing polymers comprising 3 or more arms or branches, which, in some embodiments, contain at least about 20, or at least 50 or 100 or 200 or 350 or 500 or 1000 carbon atoms. The arms are generally attached to a multivalent organic moiety which acts as a "core" or "coupling agent." The multi-armed polymer may be referred to as a radial or star polymer, or even a "comb" polymer, or a polymer otherwise having multiple arms or branches as described herein.

Star polymers may be prepared by a number of known polymerization methods, including atom transfer radical polymerization (ATRP), reversible addition-fragmentation chain transfer (RAFT) polymerization, nitroxide mediated polymerization (NMP), or anionic polymerization. A detailed discussion of ATRP is given in Chapter 11, pages 523 to 628 of the *Handbook of Radical Polymerization*, Edited by Krzysztof Matyjaszewski and Thomas P. Davis, John Wiley and Sons, Inc., 2002 (hereinafter referred to as "Matyjaszewski"). See in particular reaction scheme 11.1 on page 524, 11.4 on page 556, 11.7 on page 571, 11.8 on page 572, and 11.9 on page 575.

RAFT polymerization may be employed when the core portion of the polymer contains a functional group of formula (I) below wherein Y is represented by —S—C(=S)—R⁵ where R⁵ may be an alkyl radical containing 1 to 20 carbon atoms. The Y functionality may be derived from or be a portion of a chain transfer agent. In certain embodiments the core portion comprises a functional group (often from a chain transfer agent) derived from a compound comprising a thiocarbonyl thio group and a free radical leaving groups, such as those disclosed in paragraph 0146 of U.S. Application 2007/0244018.

Examples of RAFT chain transfer agents include benzyl 1-(2-pyrrolidinone)carbodithioate, benzyl (1,2-benzenedicarboximido)carbodithioate, 2-cyanoprop-2-yl 1-pyrrolecarbodithioate, 2-cyanobut-2-yl 1-pyrrolecarbodithioate, benzyl 1-imidazolecarbodithioate, N,N-dimethyl-S-(2-cyanoprop-2-yl)dithiocarbamate, N,N-diethyl-S-benzyldithiocarbamate, cyanomethyl 1-(2-pyrrolidone)carbodithioate, cumyl dithiobenzoate, N,N-diethyl S-(2-ethoxy-carbonylprop-2-yl)dithiocarbamate, O-ethyl-S-(1-phenylethyl)xanthtate, O-ethyl-S-(2-(ethoxycarbonyl)prop-2-yl)xanthate, O-ethyl-S-(2-cyanoprop-2-yl)xanthate, O-ethyl-S-(2-cyanoprop-2-yl)xanthate, O-ethyl-S-cyanomethyl xanthate, O-phenyl-S-benzyl xanthate, O-pentafluorophenyl-S-benzyl xanthate, 3-benzylthio-5,5-dimethylcyclohex-2-ene-1-thione or benzyl 3,3-di(benzylthio)prop-2-enedithioate, S,S'-bis-(α,α'-disubstituted-α"-acetic acid)-trithiocarbonate, S,S'-bis-(α,α'-disubstituted-α"-acetic acid)-trithiocarbonate or S-alkyl-S'-(-(α,α'-disubstituted-α"-acetic acid)-trithiocarbonates, dithiobenzoic acid, 4-chlorodithiobenzoic acid, benzyl dithiobenzoate, 1-phenyl ethyl dithiobenzoate, 2-phenylprop-2-yl dithiobenzoate, 1-acetoxyethyl dithiobenzoate, hexakis(thiobenzoylthiomethyl)-benzene, 1,4-bis(thiobenzoylthiomethyl)benzene, 1,2,4,5-tetrakis(thiobenzoylthio-methyl)benzene, 1,4-bis-(2-(thiobenzoylthio)prop-2-yl)benzene, 1-(4-methoxyphenyl)ethyl dithiobenzoate, benzyl dithioacetate, ethoxycarbonylmethyl dithioacetate, 2-(ethoxycarbonyl)prop-2-yl dithiobenzoate, 2,4,4-trimethylpent-2-yl dithiobenzoate, 2-(4-chlorophenyl)prop-2-yl dithiobenzoate, 3-vinylbenzyl dithiobenzoate, 4-vinylbenzyl dithiobenzoate, S-benzyl diethoxyphosphinyldithioformate, tert-butyl trithioperbenzoate, 2-phenylprop-2-yl 4-chlorodithiobenzoate, 2-phenylprop-2-yl 1-dithionaphthalate, 4-cyanopentanoic acid dithiobenzoate, dibenzyl tetrathioterephthalate, dibenzyl trithiocarbonate, carboxymethyl dithiobenzoate or poly(ethylene oxide) with dithiobenzoate end group or mixtures thereof. RAFT polymerization is also described in greater detail in Chapter 12, pages 629 to 690 of Matyjaszewski, especially pages 664 to 665.

For example, a star polymer in accordance with the present invention, may comprise (i) a core portion comprising a polyvalent (meth) acrylic monomer, oligomer or polymer thereof or a polyvalent divinyl non-acrylic monomer, oligomer or polymer thereof; and (ii) at least three arms comprising the block (meth)acrylic co-polymers as described herein. In one embodiment, the arms of the star polymer may be random copolymers or, more preferably for this invention, block or tapered block copolymers. The core portion may comprise a functional group of formula (Ia):

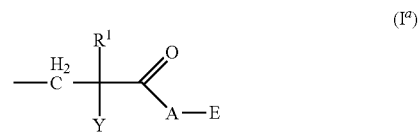

wherein E is independently another part of the core, a polymeric arm or to a monomeric species, or another structural unit as defined by formula (Ia); R¹ is hydrogen or a linear or branched alkyl group containing 1 to 5 carbon atoms; A is nitrogen or oxygen; and Y is a free radical leaving group selected from the group consisting of one or more atoms or groups of atoms which may be transferred by a radical mechanism under the polymerization conditions, a halogen, a nitroxide group, or a dithio ester group. In another embodiment, the bond shown at the left of structure (Ia) may be attached to a Z group, where Z is a polymeric group such as a crosslinked polymeric group.

Examples of the polyvalent unsaturated (meth)acrylic monomer useful for forming the polymer core include ethylene glycol diacrylate, ethylene glycol di(meth)acrylate, diethylene glycol diacrylate, diethylene glycol di(meth)acrylate, glycerol diacrylate, glycerol triacrylate, mannitol hexaacrylate, 4-cyclohexanediol diacrylate, 1,4-benzenediol di(meth)acrylate, neopentylglycol diacrylate, 1,3-propanediol diacrylate, 1,5-pentanediol di(meth)acrylate, bis-acrylates and bis-(meth)acrylates of polyethylene glycols of molecular weight 200-4000, polycaprolactonediol diacrylate, 1,1,1-trimethylolpropane diacrylate, 1,1,1-trimethylolpropane triacrylate, pentaerythritol diacrylate, pentaerythritol triacrylate, pentaerythritol tetraacrylate, triethylene glycol diacrylate, triethylene glycol di(meth)acrylate, 1,1,1-trimethylolpropane tri(meth)acrylate, hexamethylenediol diacrylate or hexamethylenediol di(meth)acrylate, vinyl (meth)acrylate, allyl (meth)acrylate or an alkylene bis-(meth)acrylamide.

Examples of the polyvalent or divalent unsaturated non-acrylic monomer useful for forming the polymer core include divinylbenzene, ethylene glycol divinyl ether, diethylene glycol divinyl ether, triethylene glycol divinyl ether, poly(ethylene glycol) divinyl ether, butanediol divinyl ether, bicyclo[2.2.1]hepta-2,5-diene.

The amount of core portion or coupling agent may be an amount suitable to provide coupling of previously prepared polymeric arms onto the core in monomeric, oligomeric, or polymeric form, to provide a star polymer. As described above, suitable amounts may be determined readily by the person skilled in the art with minimal experimentation, even though several variables may be involved. For example, if an excessive amount of coupling agent is employed, or if excessive unreacted monomer from the formation of the polymeric arms remains in the system, crosslinking rather than star formation may occur. Typically the mole ratio of polymer arms to coupling agent may be 50:1 to 1.5:1 (or 1:1), or 30:1 to 2:1, or 10:1 to 3:1, or 7:1 to 4:1, or 4:1 to 1:1. In other embodiments the mole ratio of polymer arms to coupling agent may be 50:1 to 0.5:1, or 30:1 to 1:1, or 7:1 to 2:1. The desired ratio may also be adjusted to take into account the length of the arms, longer arms sometimes tolerating or requiring more coupling agent than shorter arms.

The arms of the star polymer as described herein may include block or tapered block copolymers as described above. In one embodiment the star polymer comprises at least 3 arms, in another embodiment at least 5 arms, in another embodiment at least 7 arms, in another embodiment at least 10 arms, for instance 12 to 100, 14 to 50, or 16 to 40 arms. In one embodiment the star polymer may have 120 arms or less, in another embodiment 80 arms or less, in another embodiment 60 arms or less. In certain embodiments there may be 3 to 20, 5 to 20, or 6 to 15, or 7 to 8 arms per star. Such multi-armed polymers and their preparation are described in greater detail in WO2015/142482, Sep. 24, 2015, see in particular paragraphs 0017 through 0064.

Particularly useful poly(meth)acrylate copolymers for this invention include block or tapered block poly(meth)acrylate polymers (P) which have a first block ($B_1$) that is substantially insoluble or insoluble in the base oil of the lubricating composition and a second block ($B_2$) which is substantially soluble or soluble in the base oil of the lubricating composition. The first block may comprise one or more monomers that form polymers which are substantially insoluble in the base oil. For example, the first block ($B_1$) may comprise at least 50 mol %, for example, 50 mol % to 100 mol %, or further for example, 50 mol % to 98 mol %, of $C_1$ to $C_4$ alkyl (meth)acrylate-derived units (typically including methyl methacrylate). In one embodiment, block $B_1$ is derived from two or more of $C_1$, $C_2$, $C_3$, and $C_4$ alkyl (meth)acrylate derived units. In another embodiment, the first block comprises at least 50 mol %, for example 50 mol % to 100 mol % of an aromatic (meth)acrylate derived unit or styrene. For example, the aromatic monomers, include but are not limited to benzyl methacrylate, phenyl methacrylate, phenylpropyl methacrylate, or styrene. It is contemplated that mixtures of monomers may be used to form the insoluble block. In an embodiment, of the invention, the first block may comprise 50 mol % to 100 mol % of a mixture of $C_1$ to $C_4$ alkyl (meth)acrylate-derived units and aromatic (meth)acrylate monomers and/or styrene. In some embodiments, the first block is substantially free of styrene.

In one embodiment, the second block ($B_2$) comprises at least 50 mol %, for example, 50 mol % to 100 mol %, further for example, 50 mol % to 98 mol %, of $C_8$ to $C_{32}$ alkyl (meth)acrylate derived units, for example $C_8$ to $C_{24}$. In some embodiments, the substantially soluble block ($B_2$) comprises $C_{10}$ to $C_{18}$ alkyl(meth)acrylate derived units, $C_{12}$ to $C_{18}$ alkyl(meth)acrylate derived units, or even $C_{12}$ to $C_{16}$ alkyl (meth)acrylate derived units. In one embodiment, block $B_2$ is derived from two or more of $C_8$, $C_9$, $C_{10}$, $C_{11}$, $C_{12}$, $C_{13}$, $C_{14}$, $C_{15}$, $C_{16}$, $C_{17}$, or $C_{18}$ alkyl (meth)acrylate derived units.

In one embodiment, the poly(meth)acrylate copolymer (P) comprises a first block ($B_1$) which contains at least 50 mol %, for example 50 mol % to 98 mol %, or even 50 mol % to 100 mol % methyl (meth)acrylate derived units and a second block ($B_2$) which contains at least 50 mol %, for example, 50 mol % to 99 mol %, or even 50 mol % to 100 mol % of a mixture of two or more of $C_{12}$, $C_{13}$, $C_{14}$, $C_{15}$, $C_{16}$, $C_{17}$, $C_{18}$ alkyl(meth)acrylate derived units. In one embodiment, the first block consists of methyl(meth)acrylate derived units and the second block consists of a mixture of two or more of $C_{12}$, $C_{13}$, $C_{14}$, $C_{15}$, $C_{16}$, $C_{17}$, $C_{18}$ alkyl(meth)acrylate derived units. In another embodiment, the poly(meth)acrylate copolymer (P) comprises a first block ($B_1$) which contains at least 50 mol %, for example 50 mol % to 98 mol %, or even 50 mol % to 100 mol % benzyl (meth)acrylate methyl derived units and a second block ($B_2$) which contains at least 50 mol %, for example, 50 mol % to 99 mol %, or even 50 mol % to 100 mol % of a mixture of two or more of $C_{12}$, $C_{13}$, $C_{14}$, $C_{15}$, $C_{16}$, $C_{17}$, $C_{18}$ alkyl(meth) acrylate derived units. In one embodiment, the first block consists of methyl(meth)acrylate derived units and the second block consists of a mixture of two or more of $C_{12}$, $C_{13}$, $C_{14}$, $C_{15}$, $C_{16}$, $C_{17}$, $C_{18}$ alkyl(meth)acrylate derived units.

In some embodiments, the poly(meth)acrylate polymers described herein, in particular the block co-polymers described herein may form self-assembled colloidally stable polymeric particles in oil. The particles may be in the form of aggregates, vesicles, rods, worms, or spheres. In one particularly useful embodiment, the particles are spheres. In one embodiment, the spheres may have a mean diameter measured by dynamic light scattering (DLS) of 10 to 300 nanometers, for example, 20 to 100 nanometers, or even 30 to 70 nanometers. The present invention may also include tri-block copolymers including the $B_1$ and $B_2$ blocks as described above, with the proviso that the third block of the polymer, when included, does not substantially alter the ability of the polymer to self-assemble as described herein. In some embodiments, the third block may be derived from polyvalent or divalent unsaturated monomers, which are suitable for crosslinking the copolymer chains. Such polyvalent or divalent unsaturated monomers, when present, can function to reinforce the self-assembled polymer particles.

In one embodiment, the block or tapered block copolymer may be a di-block copolymer, wherein the ratio of the two blocks may be 95:5 to 5:95 by mol, or 80:20 to 20:80 by mol, or 70:30 to 30:70 by mol.

In another embodiment, the poly(meth)acrylate copolymer is a star or radial copolymer having three or more arms. The arms of the star or radial copolymer comprise block copolymers as described above. In one embodiment, one or more arms of the star polymer are block copolymers as described above. For example, in one embodiment, the star polymer comprises three or more arms which comprise block or tapered block copolymers, having an inner block and an outer block. In this embodiment, the inner block ($B_1$) comprises at least 50 mol %, for example, 50 mol % to 100 mol %, or further for example, 50 mol % to 98 mol %, of $C_1$ to $C_4$ alkyl (meth)acrylate-derived units (typically including methyl methacrylate). In one embodiment, block $B_1$ is derived from two or more of $C_1$, $C_2$, $C_3$, and $C_4$ alkyl (meth)acrylate derived units. In addition, in this embodiment, the outer block ($B_2$) comprises at least 50 mol %, for example, 50 mol % to 100 mol %, further for example, 50 mol % to 98 mol %, of $C_8$ to $C_{32}$, or $C_8$ to $C_{24}$ alkyl (meth)acrylate derived units. In some embodiments, the substantially soluble block ($B_2$) comprises $C_{10}$ to $C_{18}$ alkyl (meth)acrylate derived units, $C_{12}$ to $C_{18}$ alkyl(meth)acrylate derived units, or even $C_{12}$ to $C_{16}$ alkyl (meth)acrylate derived units. In one embodiment, block $B_2$ is derived from two or more of $C_8$, $C_9$, $C_{10}$, $C_{11}$, $C_{12}$, $C_{13}$, $C_{14}$, $C_{15}$, $C_{16}$, $C_{17}$, or $C_{18}$ alkyl (meth)acrylate derived units. In another embodiment, the polymer comprises an inner block ($B_1$) which comprises at least 50 mol %, for example, 50 mol % to 100 mol %, or further for example, 50 mol % to 98 mol % of aromatic (meth)acrylate derived units, such as benzyl methacrylate and an outer block ($B_2$) which comprises at least 50 mol %, for example, 50 mol % to 100 mol %, further for example, 50 mol % to 98 mol %, of $C_8$ to $C_{32}$, or $C_8$ to $C_{24}$ alkyl (meth)acrylate derived units.

In another embodiment, the poly(meth)acrylate copolymer (P) comprises a star polymer having at least three arms, wherein one or more arms comprises an inner block ($B_1$) which contains at least 50 mol %, for example 50 mol % to 99 mol %, or even 50 mol % to 100 mol % methyl (meth)acrylate derived units and an outer block block ($B_2$) which contains at least 50 mol %, for example, 50 mol % to 99 mol %, or even 50 mol % to 100 mol % of a mixture of two or more of $C_{12}$, $C_{13}$, $C_{14}$, $C_{15}$, $C_{16}$, $C_{17}$, $C_{18}$ alkyl(meth)acrylate derived units. In one embodiment, the inner block consists of $C_1$ to $C_4$ akyl (meth)acrylate derived units, such as methyl(meth)acrylate derived units, and the outer block consists of a mixture of two or more of $C_{12}$, $C_{13}$, $C_{14}$, $C_{15}$, $C_{16}$, $C_{17}$, $C_{18}$ alkyl(meth)acrylate derived units.

The molecular weight of the poly(meth)acrylate polymers may be determined using known methods, such as Gel Permeation Chromatography ("GPC" analysis using polystyrene standards. Methods for determining molecular weights of polymers are well known. The methods are described for instance: (i) P. J. Flory, "Principles of Polymer Chemistry", Cornell University Press 91953), Chapter VII, pp 266-315; or (ii) "Macromolecules, an Introduction to Polymer Science", F. A. Bovey and F. H. Winslow, Editors, Academic Press (1979), pp 296-312.

Linear poly(meth)acrylates of the invention as described herein have weight average molecular weight ($M_w$) of 1000 to 400,000 Daltons, or 5,000 to 50,000 Daltons, or even 5,000 to 200,000 Daltons, or even 5000 to 150,000 Daltons, or even 8,000 to 100,000, or 10,000 to 80,000 Daltons.

Radial, cross-linked or star copolymers of the invention may be derived from linear random or di-block copolymers with molecular weights as described above. A star polymer of the invention may have a weight average molecular weight of 10,000 to 1,500,000 Daltons, or 40,000 to 1,000,000 Daltons, or 300,000 to 850,000 Daltons.

The lubricating compositions of the present invention comprise 0.25 wt % to 15 wt %, or 0.5 wt % to 10 wt %, or 1 to 5 wt %, or even 2.5 wt % to 5 wt % of the poly(meth)acrylate copolymer as described herein. If the present invention is in the form of a concentrate (which may be combined with additional oil to form, in whole or in part, a finished lubricant), the ratio of the polymer of the invention and other optional performance additives in an oil of lubricating viscosity, to diluent oil including in the range of 80:20 to 10:90 by weight.

In one embodiment, the lubricating composition of the present invention comprises (a) an oil of lubricating viscosity; (b) an ethylene-α-olefin copolymer, wherein the ethylene-α-olefin copolymer is functionalized with 1.5% to 3.5% by weight of an acylating agent, for example, maliec anhydride and an equivalent mole percent of a hydrocarbyl amine, wherein the functionalized ethylene-α-olefin copolymer has a weight average molecular weight of 100,000 Daltons up to 175,000 Daltons; and (c) a poly(meth)acrylate polymer wherein the poly(meth)acrylate polymer comprises a block or tapered block copolymer (P) comprising a first block ($B_1$) which is substantially insoluble in the base oil and a second block ($B_2$) which is substantially soluble in the base oil, wherein the first block ($B_1$) comprises or consists of at least 50 mol % at least two of $C_1$, $C_2$, $C_3$ or $C_4$ (meth)acrylate derived units and the second block ($B_2$) comprises or consists of at least 50 mol % of at least two of $C_{12}$, $C_{13}$, $C_{14}$, $C_{15}$, $C_{16}$, $C_{17}$, or $C_{18}$ (meth)acrylate derived units. The lubricating composition may further contain one or more additional performance additives as described below.

Other Performance Additives

The lubricating composition of the present invention optionally further includes one or more additional performance additives. The other performance additives include metal deactivators, detergents, dispersants, viscosity modifiers, friction modifiers, dispersant viscosity modifiers, extreme pressure agents, antiwear agents, antioxidant, corrosion inhibitors, foam inhibitors, demulsifiers, pour point depressants, seal swelling agents and mixtures thereof.

The total combined amount of the other performance additives present on an oil free basis ranges from 0 wt % to 25 wt %, in one embodiment 0.01 wt % to 20 wt %, in another embodiment 0.1 wt % to 15 wt % and in yet another embodiment 0.5 wt % to 10 wt % of the composition. Although one or more of the other performance additives may be present, it is common for the other performance additives to be present in different amounts relative to each other.

Antioxidants include a molybdenum dithiocarbamate, a sulphurised olefin, a hindered phenol, a diphenylamine; detergents include neutral or overbased, Newtonian or non-Newtonian, basic salts of alkali, alkaline earth and transition metals with one or more of a phenate, a sulphurised phenate, a sulphonate, a carboxylic acid, a phosphorus acid, a mono- and/or a di-thiophosphoric acid, a saligenin, an alkylsalicylate, a salixarate; and dispersants include N-substituted long chain alkenyl succinimides as well as posted treated versions thereof; post-treated dispersants include those by reaction with urea, thiourea, dimercaptothiadiazoles, carbon disulphide, aldehydes, ketones, carboxylic acids, hydrocarbon-substituted succinic anhydrides, nitriles, epoxides, boron compounds, and phosphorus compounds.

Antiwear agents include compounds such as metal thiophosphates, especially zinc dialkyldithiophosphates, phosphoric acid esters or salt thereof, phosphites; and phosphorus-containing carboxylic esters, ethers, and amides; antiscuffing agents including organic sulphides and polysulphides, such as benzyldisulphide, bis-(chlorobenzyl) disulphide, dibutyl tetrasulphide, di-tertiary butyl polysulphide, di-tert-butylsulphide, sulphurised Diels-Alder adducts or alkyl sulphenyl N'N-dialkyl dithiocarbamates; and extreme pressure (EP) agents including chlorinated wax, organic sulphides and polysulphides, such as benzyldisulphide, bis-(chlorobenzyl) disulphide, dibutyl tetrasulphide, sulphurised methyl ester of oleic acid, sulphurised alkylphenol, sulphurised dipentene, sulphurised terpene, and sulphurised Diels-Alder adducts. Phosphosulphurised hydrocarbons, metal thiocarbamates, such as zinc dioctyldithiocarbamate and barium heptylphenol diacid may also be used in the composition of the invention.

Additionally the invention may also include friction modifiers including fatty amines, esters such as borated glycerol esters, fatty phosphites, fatty acid amides, fatty epoxides, borated fatty epoxides, alkoxylated fatty amines, borated alkoxylated fatty amines, metal salts of fatty acids, fatty imidazolines, condensation products of carboxylic acids and polyalkylene-polyamines, amine salts of alkylphosphoric acids; viscosity modifiers including hydrogenated copolymers of styrene-butadiene, ethylene-propylene polymers, polyisobutenes, hydrogenated styrene-isoprene polymers, hydrogenated isoprene polymers, polymethacrylate acid esters, polyacrylate acid esters, polyalkyl styrenes, alkenyl aryl conjugated diene copolymers, polyolefins, polyalkylmethacrylates and esters of maleic anhydride-styrene copolymers; and dispersant viscosity modifiers (often referred to as DVM) include functionalised polyolefins, for example, ethylene-propylene copolymers that have been functionalized with the reaction product of maleic anhydride and an amine, a polymethacrylate functionalised with an amine, or esterified styrene-maleic anhydride copolymers reacted with an amine.

Anti-foam agents, also known as foam inhibitors, are known in the art and include organic silicones and non-silicon foam inhibitors. Examples of organic silicones include dimethyl silicone and polysiloxanes. Examples of non-silicon foam inhibitors include copolymers of ethyl acrylate and 2-ethylhexylacrylate, copolymers of ethyl acrylate, 2-ethylhexylacrylate and vinyl acetate, polyethers, polyacrylates and mixtures thereof. In some embodiments the anti-foam is a polyacrylate. Antifoams may be present in the composition from 0.001 wt % to 0.018 wt % or 0.004 wt % or even 0.001 wt % to 0.045 wt %.

Demulsifiers are known in the art and include derivatives of propylene oxide, ethylene oxide, polyoxyalkylene alcohols, alkyl amines, amino alcohols, diamines or polyamines reacted sequentially with ethylene oxide or substituted ethylene oxides or mixtures thereof. Examples of demulsifiers include polyethylene glycols, polyethylene oxides, polypropylene oxides, (ethylene oxide-propylene oxide) polymers and mixtures thereof. In some embodiments the demulsifiers is a polyether. Demulsifiers may be present in the composition from 0.001 wt % to 0.018 wt % or 0.004 wt % or even 0.001 wt % to 0.045 wt %.

Other performance additives such as corrosion inhibitors including octylamine octanoate, condensation products of dodecenyl succinic acid or anhydride and a fatty acid such as oleic acid with a polyamine; metal deactivators including derivatives of benzotriazoles, 1,2,4-triazoles, benzimidazoles, 2-alkyldithiobenzimidazoles or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides; and seal swell agents including Exxon Necton-37™ (FN 1380) and Exxon Mineral Seal Oil (FN 3200) may also be used in the composition of the invention.

INDUSTRIAL APPLICATION

The invention is useful for a variety of applications for the production of star polymers by the process described above. The use of the composition described above, for instance in a transmission fluid, a gear oil, a hydraulic fluid, or an internal combustion engine lubricant\In one embodiment the lubricating composition is a gear oil and in another embodiment an automatic transmission fluid and in another embodiment an internal combustion engine fluid for crankcase lubrication.

If the present invention is in the form of a concentrate (which may be combined with additional oil to form, in whole or in part, a finished lubricant), the ratio of the polymer of the invention and other optional performance additives in an oil of lubricating viscosity, to diluent oil including in the range of 80:20 to 10:90 by weight.

The following examples provide illustrations of the invention. These examples are non-exhaustive and are not intended to limit the scope of the invention.

EXAMPLES

Example 1—a Poylmethacrylate Block Copolymer was Prepared as Follows

A 2000 mL reaction vessel equipped with overhead stirrer, water condenser, temperature controller and nitrogen inlet was charged with butyl 2-(dodecylthiocarbonothioylthio)-2-methylpropionate (22.04 g) and mineral oil (200 g) and heated to 100° C. under a nitrogen atmosphere. Lauryl methacrylate (200 g) and tert-butyl peroxy-2-ethylhexanoate (3.65 g) were separately mixed and placed under nitrogen atmosphere. This mixture was then fed to the reaction vessel via a peristaltic pump over 90 minutes at 100° C. After complete addition, the reaction was stirred at 100° C. for 3 hours until greater than 95% monomer conversion as observed by FT-IR. The resulting solution of poly(lauryl methacrylate) macromonomer ($M_w$=11,700 g mol$^{-1}$, $M_w/M_n$=1.09) was diluted with mineral oil (231.7 g) at 100° C. Methyl methacrylate (204.5 g) and tert-butyl peroxy-2-ethylhexanoate (1.89 g) were separately mixed and placed under a nitrogen atmosphere before feeding to the reaction vessel via a peristaltic pump over 90 minutes. After complete addition the reaction mixture was stirred at 100° C. for 2 hours until greater than 95% monomer conversion was observed by FT-IR, thus yielding poly(lauryl methacrylate)-block-poly(methyl methacrylate) [$M_w$=17,700 g mol$^{-1}$, $M_w/M_n$=1.15]. Ethyleneglycol dimethacrylate (40.4 g) and tert-butyl peroxy-2-ethylhexanoate (0.92 g) were mixed separately under a nitrogen atmosphere and added to the reaction vessel via a peristaltic pump over 20 minutes. After complete addition the reaction was stirred at 100° C. for a further 40 minutes to yield poly(lauryl methacrylate)-block-poly(methyl methacrylate)-block-poly(ethyleneglycol dimethacrylate).

Example 2—a Second Polymethacrylate Block Copolymer was Prepared as Follows

A 2000 mL reaction vessel equipped with overhead stirrer, water condenser, temperature controller and nitrogen inlet was charged with butyl 2-(dodecylthiocarbonothioylthio)-2-methylpropionate (25.43 g) and mineral oil (200 g) and heated to 100° C. under a nitrogen atmosphere. Lauryl methacrylate (200 g) and tert-butyl peroxy-2-ethylhexanoate (3.65 g) were separately mixed and placed under a nitrogen atmosphere. This mixture was then fed to the reaction vessel via a peristaltic pump over 90 minutes at 100° C. After complete addition the reaction was stirred at 100° C. for a further 3 hours until greater than 95% monomer conversion as determined by FT-IR. The resulting solution of poly (lauryl methacrylate) macromonomer ($M_w$=11,200 g mol$^{-1}$, $M_w/M_n$=1.09) was diluted with mineral oil (378.3 g) whilst maintaining the temperature at 100° C. Benzyl methacrylate (359.9 g) and tert-butyl peroxy-2-ethylhexanoate (1.89 g) were separately mixed and placed under a nitrogen atmosphere before feeding to the reaction vessel via a peristaltic pump over 145 minutes. After complete addition the reaction mixture was stirred at 100° C. for 45 minutes until greater than 95% monomer conversion was observed by FT-IR. A further portion of tert-butyl peroxy-2-ethylhexanoate (0.50 g) was charged by drop-wise addition and stirring continued at 100° C. for a further 60 minutes yielding the final product, poly(lauryl methacrylate)-block-poly(benzyl methacrylate) [$M_w$=19,200 g mol$^{-1}$, $M_w/M_n$=1.15].

Lubricating compositions were formulated as set forth in Tables 1 and 2. In Tables 1 and 2, dVM refers to a polymer having an ethylene-propylene copolymer backbone that is functionalized with 3% by weight maliec anhydride and 4% by weight 3-nitroaniline and HITEC 5777 is a dispersant viscosity modifier commercially available from Afton, which is an ethylene-propylene copolymer functionalized with 1.8% maliec anhydride. For the lubricating compositions in Table 1, normal stress difference $N_1$ was measured using cone-plate geometry (50 mm 0.02 Rad cone). The maximum shear rate was 1000 s$^{-1}$, and the inertia correction was 0.15 $\Omega^2 \rho R^2$ where $\Omega$ is the angular velocity of the cone, R is the cone radius, and $\rho$ is the fluid density. The vertical lifting force $F_z$ was measured using strain-controlled rheometer ARES G2 (TA instruments) and $N_1$ was calculated as $$N_1 = \frac{2F_z}{\pi R^2} + 0.15\Omega^2 \rho R^2.$$

The value of $N_1$ was determined at the shear rate $\dot{\gamma}$= 1000 s$^{-1}$ and T=5° C.

TABLE 1

| Example | Components (% wt active polymer) (the remainder consisting of mineral oil) | N1 @ 1000 s-1 and 5° C./Pa (steady shear) |
|---|---|---|
| 1 | 10.0% wt Example 2 | 6 |
| 2 | 1.5% wt ethylene-propylene copolymer | 258 |
| 3 | 1.5% wt ethylene-propylene copolymer + 10.0% wt Example 2 | 408 |
| 4 | 1.5% wt dVM | 466 |
| 5 | 1.5% wt dVM + 10.0% wt Example 2 | 819 |

For the compositions set forth in Table 2, the viscoelastic properties, including Steady Flow as described above were measured. Transient Extensional Flow was measured using a capillary breakup extensional rheometer (CaBER™1, ThermoFisher Scientific) coupled with ultrafast camera (Fastcam S4, Photron, Inc.) with a resolution of 1.9 μm/pixel. The minimal filament diameter and extensional viscosity were calculated using image analysis software Edgehog developed by Prof. Ch. Clasen (KU Leuven, Belgium). The normal stress difference in this case was calculated from the maximal extensional viscosity using strain rate $\dot{\varepsilon}$=1000 s$^{-1}$ as $N_1 = \eta_E^{max} \dot{\varepsilon}$, where $\eta_E^{max}$ is the maximal extensional viscosity of oil. The extensional viscosity has a property to relate the first normal stress difference and elongational strain rate, whereas shear viscosity relates shear stress with shear rate. The ratio of these two viscosities is called the Trouton ratio and is used here to show enhancements in extensional viscosity as a function of the zero shear viscosity.

TABLE 2

| Example | Components (% wt active polymer) (the remainder consisting of mineral oil) | EV max/ Pa s | η0/ Pa s | N1/Pa (transient extension) | Trouton ratio (EVmax/η0) | η @ 1000 s$^{-1}$ and 5° C./Pa s | N1 @ 1000 s$^{-1}$ and 5° C./Pa (steady shear) |
|---|---|---|---|---|---|---|---|
| 6 | 1% wt ethylene-propylene copolymer | 7 | 0.07 | 7000 | 100 | 0.339 | 207.2 |
| 7 | 1% wt ethylene-propylene copolymer + 5.0% wt Example 1 | 7.3 | 0.076 | 7300 | 96 | 0.378 | 233.4 |
| 8 | 1% wt dVM | 5.6 | 0.071 | 5600 | 78.9 | 0.301 | 126.8 |
| 9 | 1% wt dVM + 2.5% wt Example 1 | 15.7 | 0.097 | 15724 | 161.5 | 0.326 | 267.6 |
| 10 | 1% wt dVM + 0.8% wt styrene-b-butadiene copolymer | 5.53 | 0.133 | 5534 | 41.6 | 0.402 | 193.7 |
| 11 | 1% wt dVM + 1.1% wt star-PMA[1] | 3.77 | 0.102 | 3774 | 36.8 | 0.325 | 130.0 |
| 12 | 1% wt HITEC 5777 | 12 | 0.11 | 12000 | 109.1 | 0.292 | 162.2 |
| 13 | 1% wt HITEC 5777 + 2.5% wt Example 1 | 45 | 0.224 | 45000 | 200.9 | 0.482 | 617.4 |

[1] Arm first star polymer derived from lauryl methacrylate and methyl methacrylate with a difunctional methacrylate core having arms with random architecture.

Additional compositions were prepared and tested to illustrate the effect of the combination of the block PMA polymer of the present invention and dVM on the flow rate of a hydraulic fluid. The flow rate was measured using a hydraulic circuit consisting of a gear pump powered by a Baldor SuperE 7.5 hp motor providing a constant 250 psi pressure. The test section through which flow was measured was 5.6 ft in length with internal diameter of 0.18 in and having a loop with a diameter of 16.5 in. The flow rate was measured with a Micromotion Coriolis CMF025 flow meter. The compositions tested and flow rates are summarized in Table 3.

TABLE 3

|  | Example | | | |
|---|---|---|---|---|
|  | 14 | 15 | 16 | 17 |
| Composition | | | | |
| Group II base oils | 98.85 | 90.85 | 93.85 | 85.85 |
| Additive[1] | 0.95 | 0.95 | 0.95 | 0.95 |
| Pour point depressant | 0.20 | 0.20 | 0.20 | 0.20 |
| Example 1 polymer |  | 8.00 |  | 8.00 |
| dVM |  |  | 5.00 | 5.00 |
| Viscosity data | | | | |
| ASTM D445 @ 100° C./cSt | 6.76 | 7.29 | 7.64 | 7.65 |
| ASTM D445 @ 40° C./cSt | 45.31 | 45.17 | 46.93 | 46.45 |
| ASTM D2270 viscosity index | 102 | 124 | 129 | 132 |
| Flow data at 20 cSt | | | | |
| Flow rate/L min−1 | 15.5 | 15.6 | 15.9 | 16.3 |
| % Increase relative to monograde | — | 1 | 3 | 5 |
| Flow data at 40 cSt | | | | |
| Flow rate/L min−1 | 11.0 | 11.2 | 11.5 | 12.0 |
| % Increase relative to monograde | — | 2 | 4 | 8 |

[1]Commercial anti-wear hydraulic additive and pour point depressant.

Additional hydraulic lubricating compositions were prepared using certain commercial dispersant viscosity modifiers and polymethacrylate polymers and the flow rate was measured as described above. The results are summarized in Table 4.

TABLE 4

|  | Fluid descriptor | | |
|---|---|---|---|
|  | 18 | 19 | 20 |
| Composition | | | |
| Group II base oils | 91.23 | 78.55 | 85.05 |
| Additive[1] | 0.95 | 0.95 | 0.95 |
| Star PMA[1] | 7.82 | 2.00 | 2.50 |
| Example 1 polymer |  | 13.5 | 8.00 |
| Commercial HITEC 5777 |  | 5.00 |  |
| dVM |  |  | 3.50 |
| Viscosity data | | | |
| ASTM D445 @ 100° C./cSt | 8.17 | 7.74 | 7.70 |
| ASTM D445 @ 40° C./cSt | 46.31 | 42.33 | 43.62 |
| ASTM D2270 viscosity index | 151 | 144 | 146 |
| Flow data at 40 cSt | | | |
| Flow rate/L min−1 | 12.3 | 14.2 | 13.1 |
| % Increase relative to linear PMA | — | 13 | 6 |
| Shear loss/20 h KRL | | | |
| CEC L-45% Shear loss | — | — | 16.7 |

[1]Linear polymethacrylate polymer having a random composition of alkyl(methacrylate) monomers with side chain lengths of C1 to C15.

It is known that some of the materials described above may interact in the final formulation, so that the components of the final formulation may be different from those that are initially added. The products formed thereby, including the products formed upon employing lubricant composition of the present invention in its intended use, may not be susceptible of easy description. Nevertheless, all such modifications and reaction products are included within the scope of the present invention; the present invention encompasses lubricant composition prepared by admixing the components described above.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, including aliphatic, alicyclic, and aromatic substituents; substituted hydrocarbon substituents, that is, substituents containing non-hydrocarbon groups which, in the context of this invention, do not alter the predominantly hydrocarbon nature of the substituent; and hetero substituents, that is, substituents which similarly have a predominantly hydrocarbon character but contain other than carbon in a ring or chain. A more detailed definition of the term "hydrocarbyl substituent" or "hydrocarbyl group" is described in paragraphs [0118] to [0119] of International Publication WO0008147704, or a similar definition in paragraphs [0137] to [0141] of published application US 2010-0197536.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A lubricating composition comprising
   (a) an oil of lubricating viscosity;
   (b) 0.1 wt % to 1 wt % of an ethylene-α-olefin copolymer, wherein the ethylene-α-olefin copolymer is grafted with a polar moiety, wherein the polar moiety comprises an acyl group and wherein the acyl group is provided by 1.5% to 3.5% by weight of an ethylenically unsaturated acylating agent based on the total weight of the ethylene-α-olefin copolymer plus the acylating agent; and (c) 0.25 wt % to 15 wt % of a poly(meth)acrylate polymer wherein the poly(meth)acrylate polymer comprises a block or tapered block copolymer (P) comprising a first block ($B_1$) having a Hildebrand solubility parameter greater than 18 $(J/m^3)^{1/2}$ and a second block ($B_2$) having a Hildebrand solubility parameter of 14 to 18 $(J/m^3)^{1/2}$, wherein the poly(meth)acrylate polymer forms a self-assembled colloidally stable particle in the oil of lubricating viscosity, wherein the first block ($B_1$) comprises at least 50 mol % at least two of $C_1$, $C_2$, $C_3$ or $C_4$ (meth)acrylate derived units and the second block ($B_2$) comprises at least 50 mol % of at least two of $C_{12}$, $C_{13}$, $C_{14}$, $C_{15}$, $C_{16}$, $C_{17}$, or $C_{18}$ (meth)acrylate derived units.

2. The lubricating composition of claim 1, wherein the poly(meth)acrylate polymer comprises a linear polymer having a weight-average molecular weight of 10,000 Da to 100,000 Da.

3. The lubricating composition of claim 1, wherein the first block ($B_1$) consists essentially of at least two of $C_1$, $C_2$, $C_3$ or $C_4$ (meth)acrylate derived units.

4. The lubricating composition of claim 1, wherein the second block ($B_2$) consists essentially of at least two of $C_{12}$, $C_{13}$, $C_{14}$, $C_{15}$, $C_{16}$, $C_{17}$, or $C_{18}$ (meth)acrylate derived units.

5. The lubricating composition of claim 1, wherein the polymer further comprises a third block comprising polyvalent or divalent unsaturated monomer units.

6. The lubricating composition of claim 1, wherein the poly(meth)acrylate polymer has a linear polymer architecture.

7. The lubricating composition of claim 1, wherein the polymethacrylate polymer wherein the block or tapered block copolymers are the arms of a star polymer having at least 3 arms.

8. The lubricating composition of claim 7, wherein the first block ($B_1$) is an inner block of the star polymer and the second block ($B_2$) is an outer block of the star polymer.

9. The lubricating composition of claim 1, wherein the acyl group is provided by an acylating agent selected from the group consisting of maleic anhydride, itaconic anhydride, chlormaleic anhydride, maleic acid, fumaric acid, (meth)acrylic acid, cinnamic acid, reactive esters of any of the foregoing, reactive chlorides of any of the foregoing, and combinations thereof.

10. The lubricating composition of claim 1, wherein the ethylene-α-olefin copolymer is further functionalized with a hydrocarbyl amine or hydrocarbyl alcohol capable of reacting with the acyl group to form an amide, imide, or ester linkage.

11. The lubricating composition of claim 10, wherein the ethylene-α-olefin copolymer is further functionalized with a hydrocarbyl amine, wherein the hydrocarbyl amine is an aromatic amine.

12. The lubricating composition of claim 11, wherein the acylating agent comprises maliec anhydride and the hydrocarbyl amine comprises 3-nitroaniline.

13. The lubricating composition of claim 1, wherein the ethylene-α-olefin copolymer comprises a copolymer of ethylene and propylene, and wherein the copolymer comprises 30 mol percent to 70 mol percent ethylene.

14. The lubricating composition of claim 1, further comprising a phosphorous containing anti-wear agent.

15. The lubricating composition of claim 1, further comprising an antioxidant.

16. The lubricating composition of claim 1, further comprising at least one detergent.

17. The lubricating composition of claim 1, further comprising at least one pour point depressant.

18. The lubricating composition of claim 1, further comprising at least one antifoam agent.

19. The lubricating composition of claim 1, further comprising at least one demulsifier.

20. The lubricating composition of claim 1, wherein the lubricating composition is free of or substantially free of zinc dialkyldithiophosphate.

21. The lubricating composition of claim 1, wherein the lubricating composition comprises:

(a) an oil of lubricating viscosity;

(b) 0.1 wt % to 0.5 wt % of the ethylene-α-olefin copolymer; and (c) 0.5 wt % to 5 wt % of the poly(meth)acrylate polymer.

22. A method of lubricating a mechanical device comprising, supplying to the mechanical device the lubricating composition of claim 1.

\* \* \* \* \*